United States Patent [19]

Kunze

[11] Patent Number: 5,036,414

[45] Date of Patent: Jul. 30, 1991

[54] MAGNETIC TAPE CASSETTE APPARATUS HAVING LOADING/UNLOADING MECHANISM WITH SPRING-BIASED COMPONENTS

[75] Inventor: Norbert Kunze, Ehringshausen, Fed. Rep. of Germany

[73] Assignee: U.S. Philips Corporation, New York, N.Y.

[21] Appl. No.: 380,183

[22] Filed: Jul. 14, 1989

[30] Foreign Application Priority Data

Jul. 28, 1988 [DE] Fed. Rep. of Germany ....... 3825589

[51] Int. Cl.[5] .............................................. G11B 17/04
[52] U.S. Cl. ...................................... 360/96.5; 360/93
[58] Field of Search ........................ 360/96.5, 96.1, 93

[56] References Cited

U.S. PATENT DOCUMENTS 4,623,945 11/1986 Deutsch et al. ...................... 360/93

FOREIGN PATENT DOCUMENTS 2027973 8/1979 United Kingdom .

*Primary Examiner*—John H. Wolff
*Assistant Examiner*—Craig A. Renner

[57] ABSTRACT

The invention relates to a magnetic tape cassette apparatus (1) having a drive mechanism which is used for playing magnetic tape cassettes, can be operated via actuating rods (13a to 15a) and has a loading mechanism which, by means of an operating rod (13a), a lift lever (3) and an operating lever (21), can draw the magnetic tape cassette (2) into a playing position and raise it and push it out into a removal position, a catch (31) of the operating rod (13a), which catch travels down a pivotal guide (25) of the operating lever (21), pivoting the operating lever (21), with the cooperation of a pushing-out spring (27a), into the removal position when the guide (25) releases this pivoting movement, and the lift lever (3) travelling by a tracking pin (31) down a lift guide (32) of the operating rod (13a) in order, during the displacement of the operating rod (13a), to lower or raise the lift lever (3) according to the lift guide (32), the pushing-out spring (27a) stressing both the operating lever (21) and the operating rod (13a) in the pushing-out direction, a lifting spring (27) stressing the lift lever (3) in the raising direction.

4 Claims, 4 Drawing Sheets

MAGNETIC TAPE CASSETTE APPARATUS HAVING LOADING/UNLOADING MECHANISM WITH SPRING-BIASED COMPONENTS

BACKGROUND OF THE INVENTION

1. Field of the Invention

The invention relates to a magnetic tape cassette apparatus having a drive mechanism which is used for playing magnetic tape cassettes, can be operated via actuating rods and has a loading mechanism which, by means of an operating rod, a lift lever and an operating lever, can draw in and lower the magnetic tape cassette into a playing position and raise and push it out into a removal position, a catch of the operating rod, which catch travels down a pivotal guide of the operating lever, pivoting the operating lever, with the cooperation of a pushing-out spring, into the removal position when the guide releases this pivoting movement, and the lift lever travelling by a tracking pin down a lift guide of the operating rod in order, during the displacement of the operating rod, to lower or raise the lift lever according to the lift guide.

2. Description of the Related Art

A magnetic tape apparatus of the type referred to above is known from German Patent Specification 3,312,136. The drive mechanism can be operated with the aid of three actuating rods, of which one can exercise an eject function and two can exercise fast-winding functions. The actuating rods are operated by hand. A loading mechanism is provided which has a cassette tray which can be lowered into a playing position and raised into a removal position by means of a lift lever which is operated by means of a tracking pin by a lift guide on the operating rod. An operating lever is furthermore provided which has a pivotal guide down which a catch pin of the operating rod travels. If a magnetic tape cassette is pushed into the cassette tray, which is in the removal position, a cassette holder mounted on the operating lever engages in a winding recess of the magnetic tape cassette. The cassette holder takes the magnetic tape cassette along in the push-in direction when the operating lever pivots in the clockwise direction into a position which it occupies during the playing operation. During this pivoting, the catch pin of the operating rod is at the same time released by the pivotal guide of the operating lever, and an eject spring pushes the operating rod forwards. This forward movement causes the tracking pin of the lift lever to run obliquely downwards in the guide, whereupon the lift lever pivots downwards about its pivot shaft and by its forward end lowers the cassette tray into the playing position.

The moving out of the operating rod is achieved with the aid of an over-centre helper spring. During the pushing in of the operating rod for the purpose of raising the cassette tray, the tracking pin of the lift lever runs upwards relatively reluctantly in the lift guide. The reluctance becomes even greater the steeper the design of the lift guide.

SUMMARY OF THE INVENTION

It is the object of the invention to make the loading mechanism of the magnetic tape apparatus easier-running during the eject movement while shortening the push-in path.

The set object is achieved according to the invention by the fact that the pushing-out spring stresses both the operating lever and the operating rod in the pushing-out direction, a lifting spring stresses the lift lever in the raising direction.

The pushing-out spring here exercises a kind of compensating stressing action. If the actuating rod is pushed in for the purpose of ejecting a cassette, the operating lever pivots forwards. If, during the insertion of a cassette, the operating lever is pivoted backwards, the operating rod moves out. The pushing-out spring is thus not stressed to varying degrees and relieved again but retains an approximately uniform stress; with regard to its configuration in terms of spring force it can therefore be optimally designed for light operating forces of the operating rod.

The raising movement of the lift lever is assisted by the lifting spring. The tracking pin therefore slides upwards more easily in the lift guide. This easier upward travel makes possible a steeper course of the lift guide and hence a shortening of the outward path of the operating rod.

According to a further development of the invention, it is provided that the pushing-out spring is a torsion spring which is arranged in the region of the pivot bearing of the operating lever and with one end limb stresses the operating lever in the pushing-out direction and with the other end limb stresses the operating rod in the pushing-out direction. Such a torsion spring is of flat design and requires only a small amount of space vertically.

According to a further development of the invention, it is provided that the lifting spring is a spiral spring which is arranged on a pivot pin of the lift lever and one end limb of which presses against the chassis and the other end limb of which presses in the raising direction against the lift lever. Within the respective ranges of movement, such a spiral spring having a plurality of windings results in virtually constant contact pressures on operating lever and lift lever.

According to a further development of the invention, it is provided that the actuating rods engage by catch arms into a recess of the operating rod in such a way that, in the event of an outward movement of the particular actuating rod, each of the catch arms takes the operating rod along in the direction of outward movement, if the latter has not already moved out.

BRIEF DESCRIPTION OF THE DRAWINGS

The invention is explained in greater detail with reference to the drawing, in which.

DETAILED DESCRIPTION OF THE PREFERRED EMBODIMENT

Figure 1:
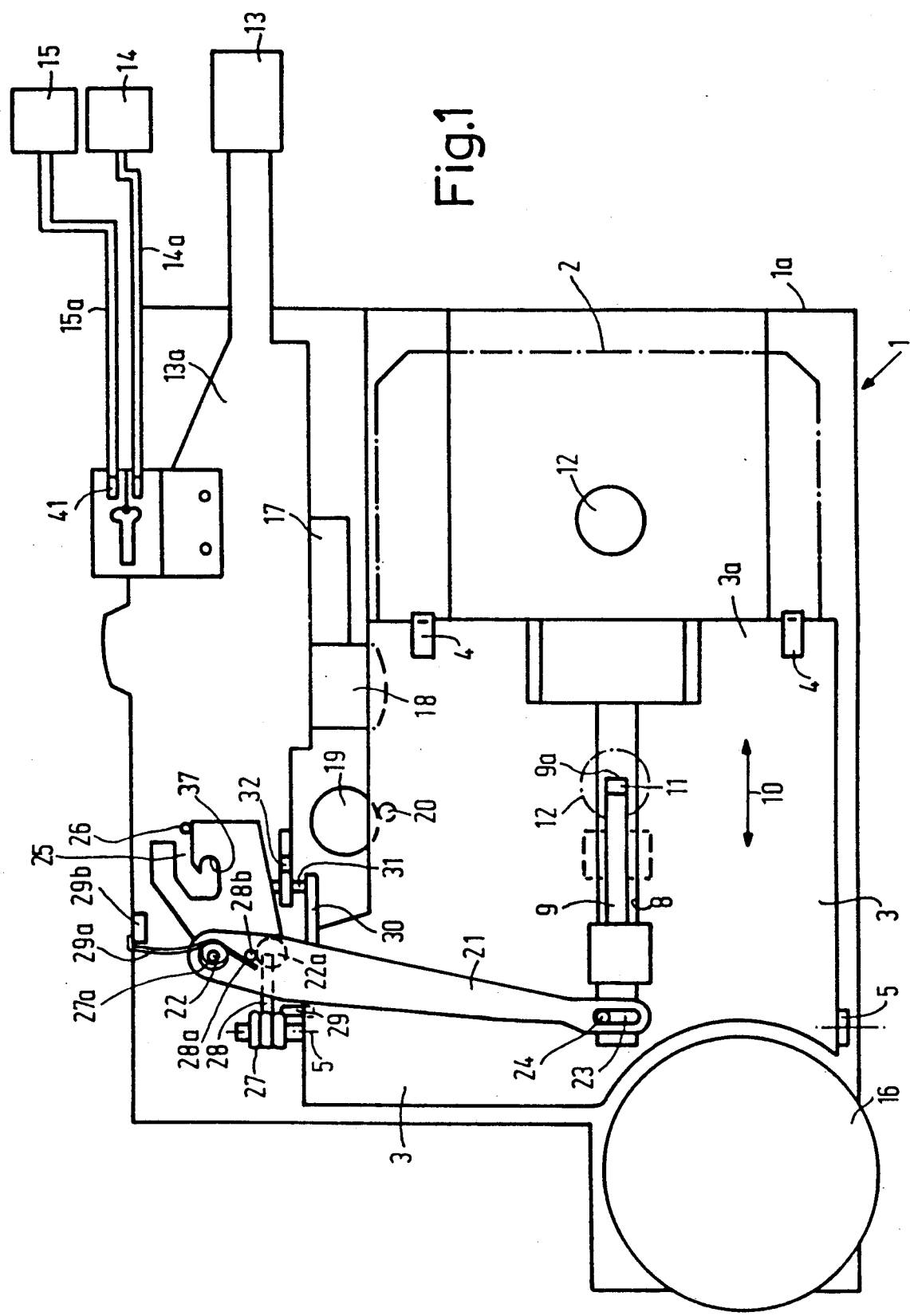
FIG. 1 shows the drive mechanism of a magnetic tape cassette apparatus having a cassette tray, lift lever, operating lever and operating rod.

The magnetic tape cassette apparatus 1 illustrated in simplified form in FIG. 1 has a cassette tray 1a into which a compact cassette has been pushed. The cassette tray 1a can be lowered perpendicularly to the plane of the drawing with the aid of a lift lever 3 which engages by its forward end 3a under retaining tabs 4 of the cassette tray 1a. The lift lever 3 can be pivoted about a shaft 5. In the lift lever 3 there is a slot guideway 8 in which a strip-shaped cassette holder 9 can be displaced in the direction of a double arrow 10. At its forward end 9a, the cassette holder 9 is provided with a lug 11 which is slotted into a winding hole 12 of the magnetic tape cassette 2. For executing the tape drive functions, an operating button 13 having an operating rod 13a and two actuating rods 14a, 15a having actuating buttons 14, 15 are provided.

A head plate 17 is provided on which are arranged a magnetic head 18 and a pinch roller 19. The pinch roller 19 cooperates with a capstan 20.

An electric motor 16 is also provided. When energized, the motor serves to rotate the capstan 20 and two winding spindles (not shown), which serve to transport the magnetic tape in the cassette 2 from a supply reel of the cassette, to the magnetic head 18 and then to a takeup reel of the cassette, thereby playing the magnetic tape.

An operating lever 21 is furthermore provided which can be pivoted about a shaft 22. At its free end, the operating lever 21 engages with a slot 23 over a peg 24 of the cassette holder 9. In the illustration according to FIG. 1, the lug 11 of the cassette holder 9 engages into one of the winding holes 12 of the cassette 2. In this position of the operating lever 21, the cassette tray 1a has been lowered into its playing position.

The operating lever 21 is provided with a pivotal guide 25 down which a catch 26 of the operating rod 13a travels. A lifting spring 27 which has end limbs 28, 29 is pushed onto the shaft 5 of the lift lever 3. One end limb 28 presses against a dome 22a of the chassis 1 in order to pivot the lift lever 3 in the clockwise direction and hence raise the cassette tray 1a into the removal position. For this purpose, the other end limb 29 presses underneath the lift lever 3.

The lift lever 3 has an extension 30 on which is arranged a tracking pin 31. This tracking pin 31 engages into a lift guide 32 aligned at an angle to the vertical. Via said pin, the lift lever can be pivoted about the shaft 5. The lifting spring 27 stresses the lift lever 3 continuously in the raising or upward-pivoting direction.

As can be seen from FIG. 1, a pushing-out spring 27a, which is designed as a torsion or spiral spring, acts in the pushing-out direction between the operating lever 21 and the operating rod 13a. The pushing-out spring 27a is designed as a flat spiral or hairpin spring. One end limb 28a is supported on an abutment pin 28b of the operating lever 21 and the other end limb 29a is supported on an abutment block 29b of the operating rod 13a. The pushing-out spring 27a continuously attempts to displace the operating lever 21 and the operating rod in the pushing-out direction.

Figure 2:
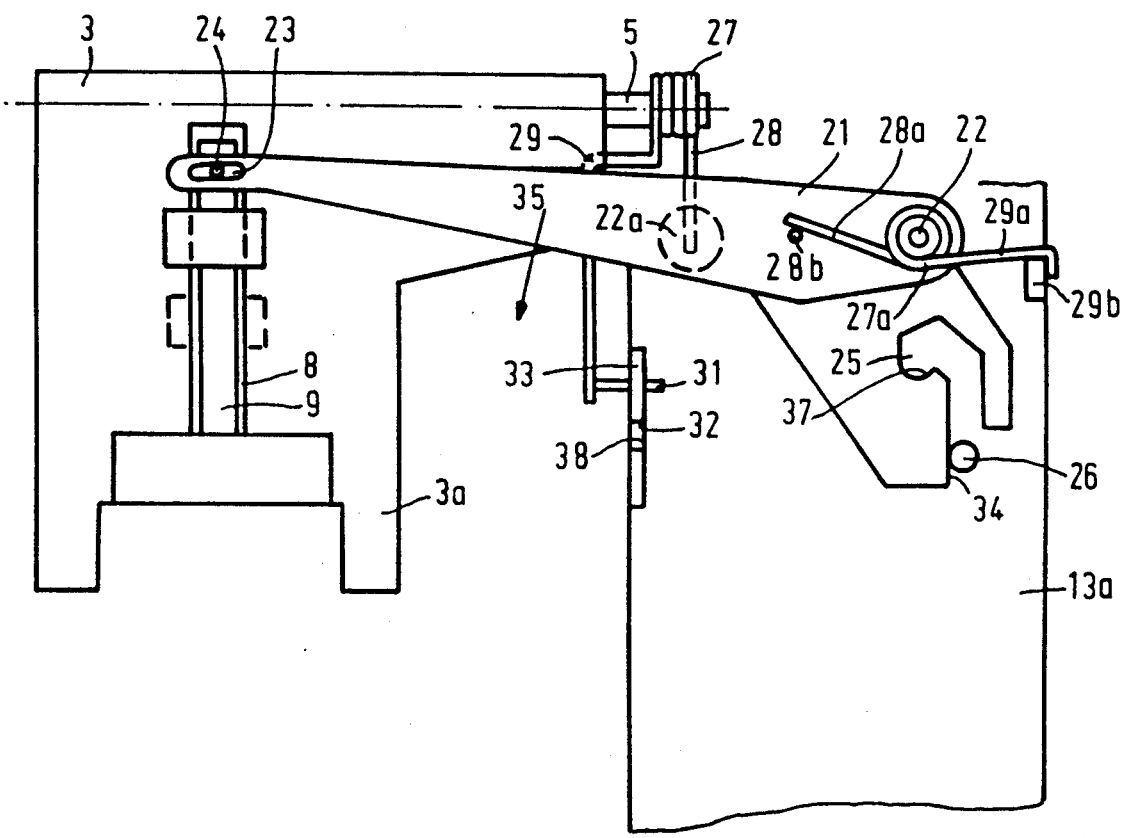
FIG. 2 shows a cut-out section of the apparatus which illustrates the interaction of lift lever, operating lever and operating rod in the playing position.
Figure 4:
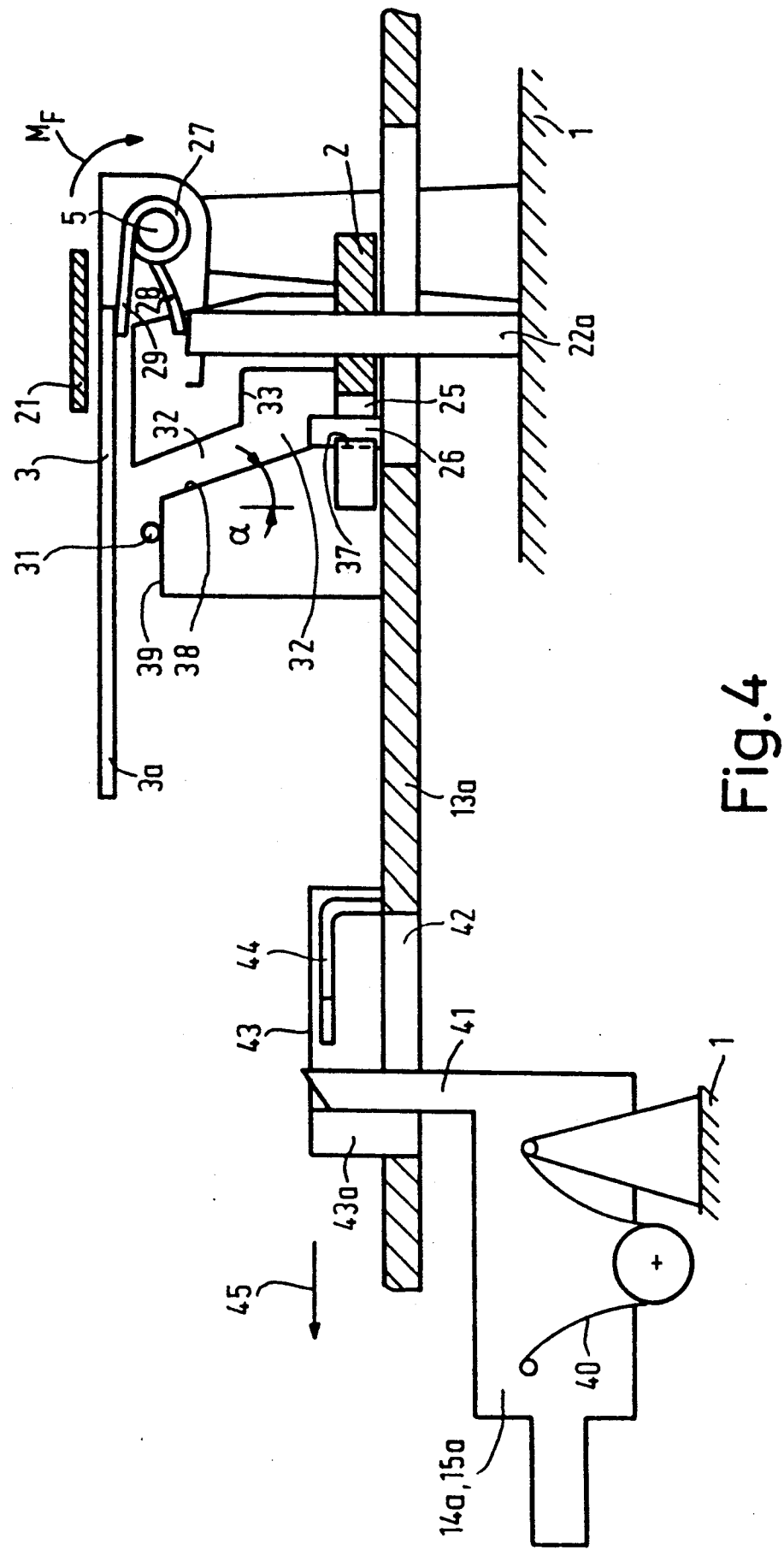
FIG. 4 shows a side view of the cut-out section according to FIG. 3.

FIG. 2 shows a cut-out section of the drive mechanism according to FIG. 1 with an enlarged representation of the loading mechanism of the drive mechanism 1 with operating rod 13a, operating lever 21 and lift lever 3 in their mutual interaction. The forward end 3a of the lift lever 3 has been pivoted downwards because the tracking pin 31 has travelled downwards in the guide 32 into the plane of the drawing and has slid under a guide wall 33 (FIG. 4). The end limb 28 of the spiral spring 27 presses against the dome 22a and the other end limb 29 presses underneath the lift lever 3. The end limb 28a of the pushing-out spring 27a presses against the abutment pin 28b and the other limb 29a of the pushing-out spring 27a presses against the abutment block 29b. The catch 26 on the operating rod 13a rests on a ramp 34 of the guide 25 of the operating lever 21. The cassette 2 has been pushed in and the cassette tray 1a lowered.

Figure 3:
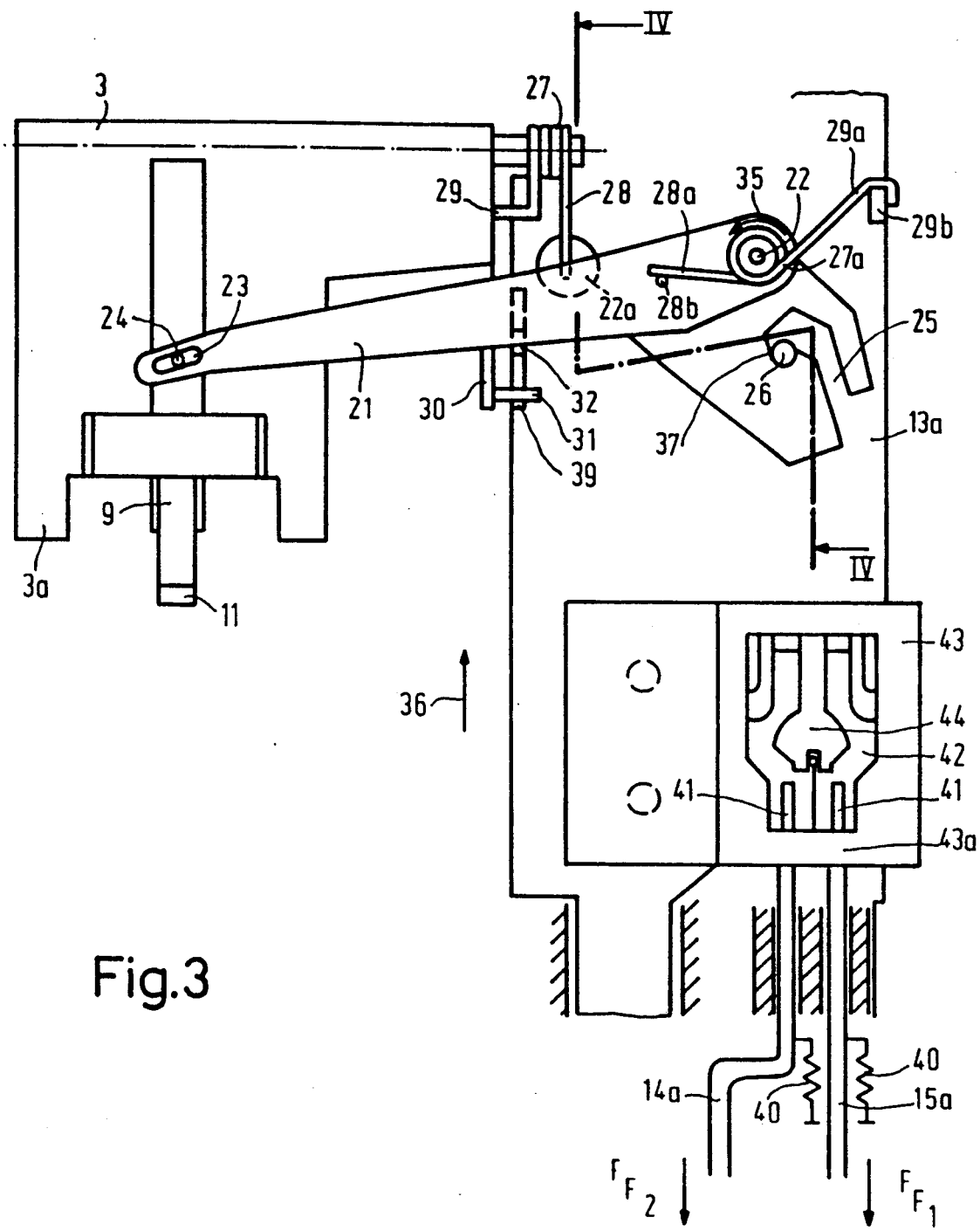
FIG. 3 shows the cut-out section according to FIG. 2 in the removal position.

FIG. 3 shows one position of the loading mechanism, the operating lever 21 having been pivoted in the direction of an arrow 35. In the process, the slot 23 has taken the pin 24 along and pushed the cassette holder 9 forwards into the removal position. This became possible because the operating rod 13a was pushed in the direction of an arrow 36 and the catch 26 was able to slot into the recess 37 of the pivotal guide 25. By virtue of this slotting of the catch 26 into the hollow 37, the operating lever 21 was released for pivoting in the direction of the arrow 35. The pivoting was caused by the end limb 28a of the hairpin spring 27 used for pushing out. Simultaneously with the pushing in of the operating rod 13a the tracking pin 31 was pushed up on an inclined ramp 38 of the lift guide 32 to an upper rest 39 of the lift guide 32. The structure of the lift guide 32 can be seen more clearly from FIG. 4.

During this upward travel, the forward end 3a of the lift lever 3 was pivoted upwards and the lift lever 3 thus raised the cassette tray 1a to be discerned in FIG. 1 into the removal position.

FIG. 3 shows the assistance given to the raising of the cassette tray 1a and the pivoting of the operating lever 21 by the push-button rods 14a and 15a. Both push-button rods are stressed in the direction of outward movement with the aid of springs which can also be seen in FIG. 4. Catch arms 41 are provided on the operating rods 14a and 15a. These catch arms 41 reach through an opening 42 in the operating rod 13a and there engage, for example, into a switch box 43 in which is situated a pivotable arm 44 which prevents the two push-button rods 14a and 15a from being pushed in simultaneously. During the outward movement of the push-button rods 14a, 15a, the catch arms 41 strike the box wall 43a and, via the box, stress the operating rod in the pushing-out direction with the forces $F_{F1}$ and $F_{F2}$ according to FIG. 3. Both springs 40 thus ensure that the operating rod 13a is always spring-loaded in the direction of outward movement.

By means of a part section IV according to FIG. 3, FIG. 4 shows the interaction of the individual components in the state according to FIG. 3. The shaft 5 about which the lift lever 3 can be pivoted can be seen. The catch 26 which is attached to the operating rod 13a lies in the hollow 37 of the pivotal guide 25. The tracking pin 31 has run upwards in the lift guide 32, via the ramp 38, onto the rest 39. The forward end 3a of the lift lever 3 has pivoted up into the horizontal position and has raised with it the cassette tray 1a (not shown in FIG. 4). The end limb 28 of the spiral spring 27 has assisted the raising of the lift lever 3, the other end limb 29, by virtue of its being supported on the dome 22a, having assisted the force for raising the lift lever 3 with the tracking pin 31.

It can also be seen from FIG. 4 how the catch arms 41 press against the box wall 43a and how the actuating rods 14a, 15a stress the operating rod 13a in the eject direction 45.

As a consequence of the raising assistance provided by the spring 27, the angle of inclination $\alpha$ of the ramp 38 of the lift guide 32 can be reduced, this resulting in a shortening of the pushing-out path.

What I claim is:

1. A magnetic tape cassette apparatus (1) having a drive mechanism which is used for playing magnetic tape cassettes, can be operated via actuating rods (13a to 15a) and has a loading mechanism which, by means of an operating rod (13a), a lift lever (3) and an operating lever (21), can draw a magnetic tape cassette (2) into a playing position and raise and push it out into a removal position, a catch (26) of the operating rod (13a), which catch travels down a pivotal guide (25) of the operating lever (21), pivoting the operating lever (21), with the cooperation of a pushing-out spring (27a), into the removal position when the guide (25) releases this pivoting movement, and the lift lever (3) travelling by a tracking pin (31) along a lift guide (32) of the operating rod (13a) in order, during the displacement of the operating rod (13a), to lower or raise the lift lever (3) according to the lift guide (32), characterized in that the pushing-out spring (27a) biases said operating lever (21) toward a position corresponding to said removal position and said operating rod (13a) toward a position corresponding to said playing position, a lifting spring (27) biases said lift lever (3) toward said removal position.

2. A magnetic tape cassette apparatus according to claim 1, characterized in that the pushing-out spring is a torsion spring (27a) which is arranged in the region of a pivot bearing (22) of the operating lever (21), with one end limb (28a) biasing said operating lever (21) and with another end limb (29a) biasing said operating rod (13a).

3. A magnetic tape cassette apparatus according to claim 1, characterized in that the lifting spring (27) is a spiral spring which is arranged on a pivot pin (5) of the lift lever (3).

4. A magnetic tape cassette apparatus according to claim 1, in which the actuating rods (14a, 15a) which are stressed in the direction of outward movement by means of springs (40) are arranged parallel to the operating rod (13a), characterized in that the actuating rods (14a, 15a) engage by catch arms (41) into a recess (42) of the operating rod (13a) in such a way that, in the event of an outward movement of one of the actuating rods (14a, 15a), each of the catch arms (41) takes the operating rod (13a) along in the direction of outward movement, if the operating rod has not already moved out.

* * * * *